United States Patent
Peiter et al.

(10) Patent No.: US 7,035,003 B2
(45) Date of Patent: Apr. 25, 2006

(54) MICROSCOPE ARRANGEMENT FOR INSPECTING A SUBSTRATE

(75) Inventors: Martin Peiter, Dresden (DE); Mandy Vogel, Dresden (DE)

(73) Assignee: Infineon Technologies, AG, Munich (DE)

( * ) Notice: Subject to any disclaimer, the term of this patent is extended or adjusted under 35 U.S.C. 154(b) by 0 days.

(21) Appl. No.: 10/991,517

(22) Filed: Nov. 19, 2004

(65) Prior Publication Data

US 2005/0122578 A1   Jun. 9, 2005

Related U.S. Application Data

(63) Continuation of application No. PCT/DE03/01644, filed on May 21, 2003.

(30) Foreign Application Priority Data

May 21, 2002 (DE) .............................. 102 22 242

(51) Int. Cl.
*G02B 21/26* (2006.01)
*G02B 21/00* (2006.01)

(52) U.S. Cl. ....................... 359/368; 259/393; 259/394
(58) Field of Classification Search ........ 359/368–395; 356/237.1–6, 399–401
See application file for complete search history.

(56) References Cited

U.S. PATENT DOCUMENTS

| 4,764,969 A | * | 8/1988 | Ohtombe et al. ........... 382/148 |
| 6,362,884 B1 | * | 3/2002 | Okahira et al. ............. 356/399 |

FOREIGN PATENT DOCUMENTS

| GB | 2 140 578 A | | 11/1984 | |
| JP | 59-10231 | * | 1/1984 | .............. 356/237.4 |
| JP | 2001-305064 | * | 10/2001 | .............. 356/237.4 |
| WO | WO 92/01958 A1 | | 2/1992 | |
| WO | WO 99/21042 A2 | | 4/1999 | |

OTHER PUBLICATIONS

English abstract of the Japanese reference Nos. 9-191036; 61-130811; and 58-033154.*

* cited by examiner

*Primary Examiner*—Thong Q Nguyen
(74) *Attorney, Agent, or Firm*—Edell, Shapiro & Finnan, LLC

(57) ABSTRACT

A microscope measuring arrangement for inspecting a substrate includes a microscope, an illuminating system, preferably a sight glass, a holder, a substrate pallet and a rotary apparatus and/or tilting apparatus. The substrate pallet can be moved between at least two positions, which lie in the visual ranges respectively of the microscope and the sight glass. The substrate is first subject to an oblique light inspection for finding defect positions by the rotary and/or tilting apparatus. Without having to remove the substrate from the substrate pallet, the microscope to undertake a high-resolution inspection for classifying the defect at the defect position found.

5 Claims, 2 Drawing Sheets

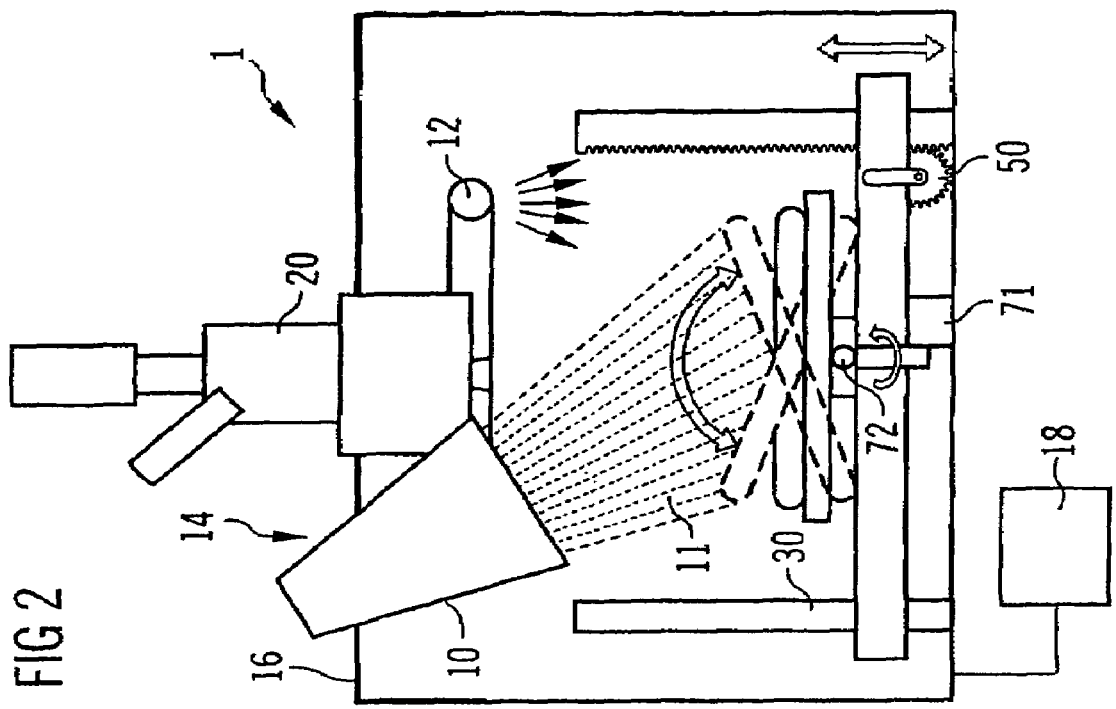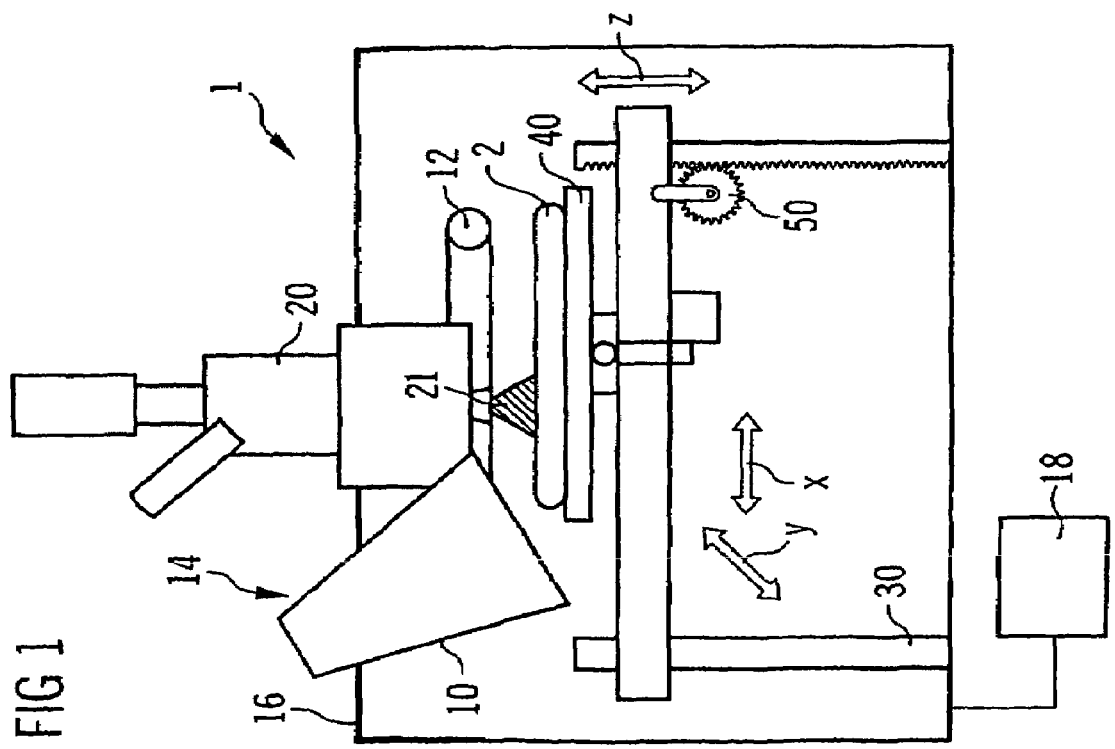

MICROSCOPE ARRANGEMENT FOR INSPECTING A SUBSTRATE

CROSS REFERENCE TO RELATED APPLICATIONS

This application is a continuation of PCT/DE03/01644, filed May 21, 2003, and titled "Microscope Arrangement for Inspecting a Substrate," which claims priority under 35 U.S.C. §119 to German Application No. DE 10222429.3, filed on May 21, 2002, and titled "Microscope Arrangement for Inspecting a Substrate," the entire contents of which are hereby incorporated by reference.

BACKGROUND OF THE INVENTION

1. Field of the Invention

The present invention relates to a microscope arrangement for inspecting a substrate, such as a semiconductor wafer, a flat panel, a mask or reticle.

2. Description of the Related Art

In order to produce integrated circuits, semiconductor substrates, masks or reticles, for example, are subject to a number of processes in which layers are respectively applied, structured or remodeled. During or between these processes, it is possible for the structures formed on the semiconductor or glass substrate to be damaged or, for disadvantageous impurities to be detected on the substrate due to increased particle formation with subsequent deposition on the substrate. In order to detect defects to the substrate or particle formations on the substrate, and to be able, in the case of detection, to institute preventive measures for subsequently produced substrates, inspections for defects and particles are carried out regularly between the respective processes.

The aim of such an inspection is to classify the particle deposition or the defect in order to be able to investigate the respective cause of the problem more accurately. The aim is also to reach a decision on further processing of the relevant substrate. Thus, for example, consideration could also be given to adding a cleaning step cleaning step or complete rejection of the substrate.

Classification of the particle or defect requires high-resolution microscopy. However, regular inspection covering all the structures on the substrate with the aid of a high-resolution microscope would slow down the production process substantially and thus lead to an increase in costs. Since a large portion of the defects and particles can be detected macroscopically, i.e., with the naked eye or with the aid of a simple sight glass, the inspection step in the fabrication of semiconductor products or masks/reticles is usually divided into two substeps.

In a first substep, an oblique light inspection is carried out, i.e., the substrate is observed by the operating staff under obliquely incident light through the sight glass at a first work station comprising an illuminating system and a sight glass having, for example, a magnifying glass. The sight glass comprises, if appropriate, an integrated reversible magnification. For example, the angle of incidence of the incident light on the substrate surface is varied manually in this case. Because the incident light is re-emitted by the substrate either in the direction of a diffractive order or the mirror reflection, diffusely reflecting particles on the surface of the substrate become particularly visible to the operator. Upon completion of this first step, the operator compiles in electronic form or on paper a report of the visual examination, specifying the type of particle or defect detected, as well as its position on the substrate.

The second substep includes evaluating the report compiled in the first substep in relation to the position of the defect or particle on the substrate at a second work station employing a high-resolution microscope. Since there is no exact coordinate grid available through the sight glass during the manually performed oblique light inspection, the positional data are naturally imprecise and frequently affected by error. Finding the relevant position of the defect or particle on the substrate in the high-resolution microscope likewise rests on the subjective judgment of the position datum by the operator of the microscope. Accordingly, a positional determination may need to be carried out anew in this step.

Moreover, a further disadvantage arises from the fact that the data transfer in the report and the transportation of the substrate from the first work station to the second work station entail increased outlay on time and costs as well as susceptibility to error.

SUMMARY OF THE INVENTION

Accordingly, improving the quality of the production process of substrates such as semiconductor wafers or masks/reticles by an improved inspection of defects and particles and reducing the outlay on time and costs required are desirable.

This and other aspects are achieved by means of a microscope arrangement for inspecting a substrate in accordance with an embodiment of the present invention.

In accordance with the present invention, the optical units, previously used in two different work stations, for carrying out the inspection of defects and particles are implemented in a common unit. Such an arrangement for inspecting a substrate comprises an illuminating system and, in accordance with an embodiment of the present invention, a sight glass for carrying out the oblique light inspection, as well as the high-resolution microscope for carrying out the classification of defect and particle. According to the present invention, the two units are fixed on a common holder of the arrangement. A substrate pallet that handles the substrate is fit to the holder in this case such that it can move along at least one coordinate direction.

The microscope arrangement also comprises an apparatus for moving the substrate pallet. This can be, for example, an electric motor that can move the substrate pallet which, for example, runs along a rail on rollers. However, other movement mechanisms are also conceivable according to the present invention, mechanisms with extremely low wear being given preference because of the existing clean room conditions.

The illuminating system serves for illuminating the substrate during the oblique light inspection. It is to be distinguished from a further illuminating system that frequently illuminates the second visual range of the microscope. Together with the sight glass it defines a first visual range, in which the oblique light inspection can be executed. It preferably has at least the extent of a wafer diameter, such that the entire surface of the wafer can be inspected visually. The spatial depth of the first visual range is preferably of the same dimension, thus currently above approximately 300 mm to approximately 500 mm, in order to permit clearance for movements of the wafer relative to the visual observer.

According to the present invention, the sight glass can be a glass disk, a magnifying glass or a lens system with a slight resolution. Because of the ever increasing requirements placed on clean room conditions, the microscope arrangement is preferably surrounded by a housing, wherein the density of contaminating particles in its interior can be lowered. As a result, a mini environment is produced. In order, nevertheless, to permit visual inspection, the invention provides a simple glass disk through which a visual observer can inspect the substrate in the first visual range within the microscope arrangement.

The high-resolution microscope can be related to a second visual range within which an arbitrary structure can be imaged with sharp contrast through the microscope.

The apparatus for moving the substrate pallet can be defined by the fact that it can be used to move the substrate pallet not only within the second visual range, but also between a first position in the first visual range and a second position in the second visual range.

The sight glass has a large diameter and a comparatively large focal length such that in addition to the large aperture angle of the visual range there can be a large extent of the visual range under the sight glass by comparison with the microscope. In the case when the sight glass comprises only a glass disk without any magnification, the visual range can also be restricted by lateral covers such as, for example, the downward-opening boxes shown in the exemplary embodiment.

By contrast, the microscope has a comparatively small depth of field range, and so the associated second visual range has only a slight extent. Since the second visual range is therefore situated very close to the objective lens of the microscope, direct observation of a substrate inserted therein through the sight glass would be impeded by the physical extent of the microscope itself. The apparatus for moving the substrate pallet advantageously solves this problem by arranging the sight glass and the microscope on the holder in such a way that the first and the second visual ranges are arranged next to or below one another, and the apparatus for moving the substrate pallet can move the latter in each case through positions in the first and second visual ranges.

Both inspections, the oblique light inspection and the high-resolution microscope inspection, can therefore be carried out immediately one after another with the use of a common substrate pallet. Since the substrate need not be taken from the substrate pallet, the orientation of the substrate on the substrate pallet remains the same for both inspections, and so an assignment of particles or defects to positions is reproducible. Neither a temporal nor a spatial separation of the two inspections leads to the need to compile a report. The same operator can execute the immediately succeeding work steps.

In accordance with the present invention, the microscope arrangement comprises a rotary apparatus for rotating and/or a device for tilting or inclining the substrate pallet. Such a device is advantageous for the first visual range, in which the oblique light inspection is carried out. Depending on the alignment of the structures on the substrate, light reflected by diffraction can, for example, be deflected through the sight glass or indeed away therefrom. It is thereby possible to detect slight defects such as, for example, focus spots on the substrate.

In accordance with an embodiment of the present invention, the visual ranges of the sight glass and the microscope overlap one another. This results, according to the invention, in a position in which both apparatuses, the sight glass and the microscope, can each effect a sharp imaging of structures on the substrate in the visual range. If this overlap range is very small for the aforementioned reasons, it is nevertheless possible to find this position again substantially immediately in the microscope, by moving the substrate pallet by the apparatus for moving the substrate pallet while noting a position found for a particle or defect,. Advantageously, this requires no data transfer.

In accordance with an additional embodiment of the present invention, the coordinate directions along which the substrate pallet can move from one visual range into the other visual range, lie parallel to the optical axis of the microscope. The advantage is that upon movement of the substrate a set position in the middle of the visual range of the microscope is not moved out of the visual range thereof.

According to the present invention, the prescription of a coordinate direction is not to be understood in the sense of a long straight line along which the substrate pallet is displaced. Rather, it is also possible for the substrate pallet to be moved along a bent curve.

In accordance with a further embodiment of the present invention, the visual ranges of the sight glass and the microscope are arranged next to one another such that the substrate pallet or the substrate is moved essentially in the plane defined by it. By the apparatus for moving the substrate pallet, the substrate pallet is advantageously fit on the holder such that it can be moved in three mutually independent directions. By appropriate computer-controlled movement of the substrate pallet through the two visual ranges, it is possible in this case to traverse particularly advantageous three-dimensional curves for the transition from the macroscopic to the microscopic inspection.

In accordance with an embodiment of the present invention, the control unit controlling the three-dimensional movement is connected to the focusing system of the microscope such that the latter can be set as a function of a conveyed spacing of the substrate pallet from the optics of the microscope.

BRIEF DESCRIPTION OF THE FIGURES

The above and still further aspects, features and advantages of the present invention will become apparent upon consideration of the following detailed description of specific embodiments thereof, particularly when taken in conjunction with the accompanying drawings wherein like reference numerals in the various figures are utilized to designate like components.

FIG. 1 shows a cross section through a first exemplary embodiment while microscope inspection is being carried out;

FIG. 2 shows a cross section through a first exemplary embodiment while the oblique light inspection is being carried out;

DETAILED DESCRIPTION OF THE INVENTION

Figure 3:
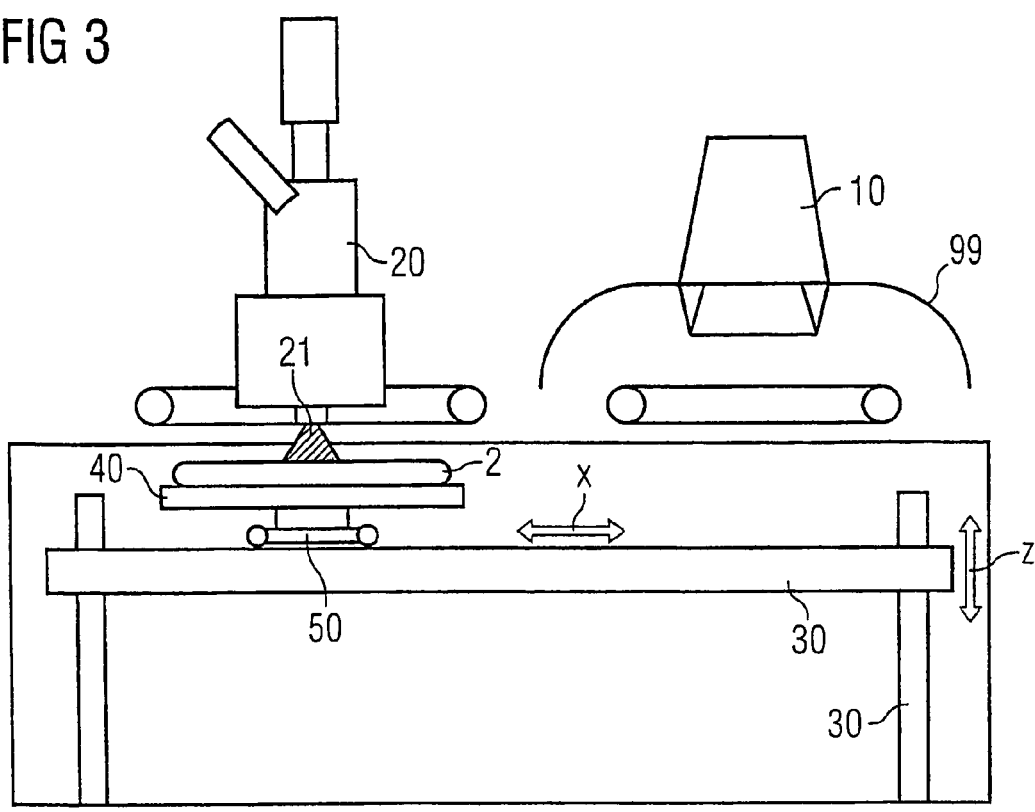
FIG. 3 shows a cross section through a second exemplary embodiment during microscope inspection.

A first exemplary embodiment of the present invention is illustrated in FIG. 1. The microscope arrangement 1 comprises a microscope 20 having a first visual range 21 within which structures on the substrate 2 are imaged with high contrast by the microscope 20. The microscope arrangement 1 further includes a housing 16 in which the substrate pallet 40 is arranged, and a controller 18 for producing a room climate with a reduced number of contaminating particles.

FIG. 1 shows the state of the microscope arrangement during the carrying out of the microscope inspection. For this purpose, the substrate 2 has been moved, resting on a substrate pallet 40, into the visual range 21 of the microscope 20. An apparatus 50 for moving the substrate pallet 40 serves to move the substrate pallet 40. In the present exemplary embodiment, the substrate pallet 40 can be moved along the optical axis of the microscope 20 (Z axis) aligned vertically in FIG. 1.

Moreover, the substrate pallet 40 can also be moved in the plane defined by the substrate 2 for fine adjustment in the microscope 20. This purpose is served in FIG. 1 by micromotors (not shown). Also provided in the microscope arrangement of this exemplary embodiment is a further apparatus for fine adjustment in the direction of the optical axis, for setting an optimal focal distance for the substrate pallet 40 which differs from the apparatus 50 for moving the substrate pallet between the visual ranges. The movement apparatuses for the fine adjustment are not designed for moving the substrate pallet 40 between the visual ranges of the sight glass 10 and the microscope 20. They have a clearance for the fine adjustment that can be designed for the microscope 20.

The microscope 20 and the sight glass 10 are fitted on a holder 30. The apparatus 50 for moving the substrate pallet 40 executes a movement of the substrate pallet 40 relative to the holder 30. As illustrated in FIG. 2, the apparatus 50 for moving the substrate pallet 40 can also approach a first visual range 11 that can be assigned to the sight glass 10. The sight glass 10 comprises a simple magnifying glass, which forms a window opening 14 in the housing 16. In order to carry out the oblique light inspection, the microscope arrangement 1 also comprises an illuminating system 12 with the aid of which the substrate 2 on the substrate pallet 40 can be illuminated. The orientation of the structures on the substrate 2 and the angle of incidence of the irradiated light can be varied by means of a tilting apparatus 72 and an apparatus 71 for rotating the substrate pallet.

In general, an inspection for detecting particles or defects on a substrate, such as a semiconductor wafer, can be firstly begun with the macroscopic oblique light inspection, which can be illustrated in FIG. 2. In accordance with detection of a particle on the substrate apparatus 50, moving the substrate pallet 40 can also be used to move the substrate in the direction of the visual range 21 of the microscope 20. The operator recognizes the position of the detected particle and can move the position of the particle found on the substrate 2 substantially precisely into the visual range 21 of the microscope 20 by a suitable movement of the substrate pallet 2 in the X-Y direction. He can carry this out without the need to remove the substrate 2 from the substrate pallet 40. He can also control the step of movement in the X-Y direction via the sight glass 10 as long as the position of the substrate pallet 40 still lies in the visual range 11.

An additional exemplary embodiment of the present invention is shown in FIG. 3. In this exemplary embodiment, the microscope 20 and the sight glass 10 are arranged next to one another and, by contrast with the previous example, their visual ranges do not overlap one another. An apparatus 50 for moving the substrate pallet 40 can be mounted on rollers that run in a rail on the holder 30. Thus, the substrate 2 resting on the substrate pallet 40 can be moved to and fro by a microscope control, illustrated in FIG. 3 in a visual range 21 of the microscope 20 for oblique light inspection under the sight glass 10 in the visual range 11, which can be illuminated by the illuminating system 12.

Figure 4:
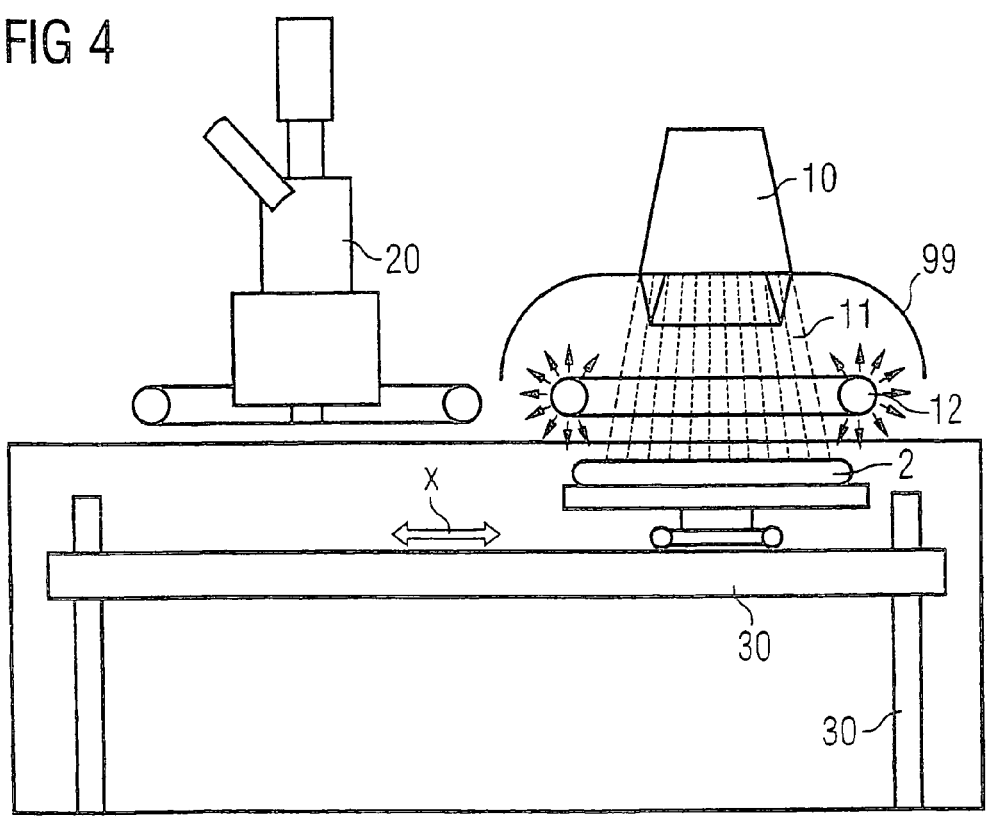
FIG. 4 shows a cross section through a second exemplary embodiment during the oblique light inspection.

In addition to the simplified design of the arrangement, a further advantage of this arrangement shown in FIGS. 3 and 4 allows for an operator to more easily move the substrate 2, thus making it is easier for him to access it in the two positions in the respective visual ranges 11, 21. Usually, the oblique light inspection can be carried out firstly, followed by the microscope inspection, but it is also possible by this arrangement to move the substrate pallet 40 to and fro substantially continuously by the apparatus 50 in order, for example, to be able to undertake anew a classification for each particle that has been detected. Such a method would be impracticable in accordance with the prior art, since the outlay on time and staff would be very high.

Reflectors 99 are laterally fit on the sight glass 10 of this exemplary embodiment to protect the observer from radiation from the illuminating system and to retro-reflect the light onto the substrate.

While the invention has been described in detail and with reference to specific embodiments thereof, it will be apparent to one skilled in the art that various changes and modifications can be made therein without departing from the spirit and scope thereof.

Accordingly, it is intended that the present invention covers the modifications and variations of this invention provided they come within the scope of the appended claims and their equivalents.

LIST OF REFERENCE NUMERALS

1 Microscope arrangement
10 Sight glass
11 First visual range of the sight glass
12 Illuminating system
14 Window Opening
16 Housing
18 Controller
20 Microscope
21 Second visual range of the microscope
30 Holder
40 Substrate pallet
50 Apparatus for moving the substrate pallet
71 Device for rotating the substrate pallet
72 Device for tilting/inclining the substrate pallet
99 Reflectors

What is claimed:

1. A microscope arrangement for inspecting a substrate, comprising:
   a sight glass for finding a macroscopic defect on a surface of a substrate in a first visual range;
   an illuminating system for illuminating the substrate in the first visual range;
   a microscope operable to generate a high resolution representation of a section on the surface of the substrate in a second visual range, the sight glass and the microscope being arranged such that the first visual range and the second visual range overlap at least partially;
   a holder on which the microscope and the sight glass are fixed;
   a substrate pallet, for handling the substrate, which is fitted on the holder such that the substrate pallet can move along at least one first coordinate direction;
   a substrate pallet moving device operabe to move the substrate pallet along the coordinate direction between at least a first position within the first visual range and a second position within the second visual range; and a substrate pallet rotating device operable to rotate and/or incline the substrate pallet.

2. The microscope arrangement as claimed in claim 1, wherein the microscope has an optical axis, and the at least one first coordinate direction in which the substrate pallet moves coincides with the optical axis.

3. The microscope arrangement as claimed in claim 1, wherein the sight glass comprises a magnifying glass.

4. The microscope arrangement as claimed in claim 1, further comprising:
   a housing in which at least the microscope, or the substrate pallet, the first and the second visual range are arranged; and
   a controller for producing a room climate with a reduced number of contaminating particles, the sight glass forming a window opening in the housing.

5. A method for inspecting a substrate, comprising:

finding a macroscopic defect on a surface of a substrate in a first visual range;

illuminating the substrate in the first visual range;

highlighing a section on the surface of the substrate in a second visual range, wherein the first visual range and the second visual range overlap at least partially;

moving the substrate along at least one coordinate direction between at least a first position within the first visual range and a second position within the second visual range; and rotating and/or inclining the substrate.

* * * * *